Patented Oct. 21, 1947

2,429,251

UNITED STATES PATENT OFFICE 2,429,251

FRUIT FLAVORED RAW SUGAR BRICKS

Alexander M. Zenzes, New York, N. Y.

No Drawing. Application August 12, 1943,
Serial No. 498,395

12 Claims. (Cl. 99—141)

This invention relates to the production of fruit flavored foods and particularly fruit flavored sugars in substantially solid mass form such as in bricks and bars which are made particularly from raw cane sugars without requiring the use of synthetic or natural fruit flavors.

It has been found by treating substantially unrefined raw cane sugars in concentrated solution at certain pH ranges and temperatures, without substantial inversion, and with the addition of a relatively small quantity of pectin, a change takes place in the objectionable tasting raw cane sugars whereby they are converted into a composition having a desirable palatable fruity taste in highly stable condition and there is no further inversion of the sucrose present.

Furthermore, when reduced to a solid condition by removal of water and the addition of a relatively small quantity of pectin, the solidified mass in brick or bar form contains sucrose which is surrounded and protected by a stable film comprising acid and heat reacted substantially raw non-crystallizable sugars, acid, water, and pectin, the pectin constituting the stabilizing agent for the mass. By adding the pectin the stability and flavor of the mass are enhanced.

An object of the present invention is therefore to provide a stable, nonfermentable, nonperishable, non-volatile, non-oxidizable solid mass in brick, bar, or other solid form in which the objectionable flavors of the raw cane sugar have been reacted to produce a highly desirable fruit flavored food composition.

A further object is to produce a solid mass which may be readily solubilized and which may be readily dispersed with other aqueous food compositions. The solubilization and ready dispersion of the solid mass is a particularly important characteristic of the product produced by the present invention.

A still further object is to raise the economic value of raw cane sugar and by the process of the present invention to convert these materials into a highly desirable readily utilizable food composition having great value.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, cane juice is defecated such as by treatment with lime and is then concentrated to crystallize out the raw sugar crystals each of which crystals contains a surface film of the non-crystallizable sugars and non-sugar impurities. The crystallization of the raw sugars from the defecated cane juice may be carried out in several successive stages whereby the non-crystallizable fraction from the first batch of raw sugar crystals is added to additional cane juice and then concentrated and crystallized again.

The raw cane sugar crystals used for the purposes of the present invention will contain between 0.35% and 1.5% total ash based upon total solids and should desirably not have been subjected to treatment with carbon, charcoal or other refining treatment to change qualitatively the non-sugar impurities naturally occurring in the raw sugar cane.

The raw cane sugar crystals thus obtained by crystallization of the defecated cane juice are then redissolved in water to obtain a raw sugar solution of over about 40 Brix, acidified to a pH of between 4.5 and 5.5, heated, preferably at superatmospheric pressures, to over 245° F. and desirably to between 255° F. and 290° F. for a period varying from 0 to about 15 minutes, but insufficient to cause any substantial inversion, desirably filtered and then acidified further to a pH of between 2.5 and 3.6, whereby a modification takes place in the objectionable tasting complexes of the raw can sugar changing them into highly desirable fruit aromas and flavors.

The highly desirable fruit aroma and flavor obtained is non-volatile and will withstand long boiling periods even at temperatures of 250° F. to 260° F. or higher.

The acid and heat reacted raw cane sugar syrup is then concentrated to between 85 and 95 Brix or the acid treatment may take place during or following concentrating.

The acid and heat reacted concentrated raw cane sugar is then further treated with pectin to produce the product of the present invention. For example, to this acid and heat reacted concentrated raw cane sugar there is then added a relatively small amount, between 0.75% and 3.0%, and preferably between about 1% and 2.0% of pectin based upon the total sugar solids present in the continuous phase of the solidified mass.

Following agitation, the acid and heat reacted raw cane sugar containing the pectin may then be poured into molds, barrels, boxes, or similar containers and allowed to solidify, under which conditions a solid mass is formed in which the sucrose crystals are surrounded and protected by a film comprising acid and heat reacted raw noncrystallizable sugars, residual acid, water and pectin.

The sucrose crystals comprise the discontinuous or dispersed phase whereas the other ingredients including the acid and heat reacted raw non-crystallizable sugars, acid, water and pectin comprise the continuous phase which continuous phase is in the form of a semi-plastic gel.

The continuous phase which is present in the form of a semi-plastic gel is always present in a minor proportion to the dispersed or discontinuous phase of the sucrose crystals. These sucrose crystals may be of varying size but they are crystalline in form and are dispersed throughout the semi-plastic gel.

The solidified mass thus obtained is a concentrated homogeneous, solid, stable, nonvolatile, nonoxidizable, fruit flavored product which will withstand wide temperature ranges, is nonhygroscopic in spite of its high acidity and may readily be used in the manufacture of a wide variety of food products.

The type of fruit flavor obtained in the solid mass may be controlled by the ash content of the raw cane sugar utilized in accordance with the procedures of the present invention. For example, raw cane sugar having an ash content of 0.5% will produce an apple or apricot flavor, whereas at an ash content of 0.75% to 1.0%, a guava or plum flavor is obtained and at an ash content of 1.0% to 1.5% a true prune flavor is obtained.

This is accomplished although the product is altogether devoid of the essential oils which are responsible for the apple, plum, guava or prune flavor normally contained in those materials.

The raw sugar containing between 0.35% and 1.5% ash based upon total sugar solids is first desirably concentrated to between 40 and 70 Brix. The raw sugar thus concentrated is then desirably modified by adding about one-half of the total acid required to produce the desired pH of 2.5 to 3.6, following which the partially acid reacted raw sugar is heated to the elevated temperature of over 245° F. and then the balance of the acid is added so as to increase the acidity to between pH 2.5 and 3.6 and complete the reaction. Before the addition of the final amount of acid, the partially acid and heat reacted sugar is desirably further concentrated to between 85 and 95 Brix.

The heat treatment and the acidity thus adjusted to between pH 2.5 and 3.6 appear to be the critical limits to produce the desired fruit flavor and complete the modification of the objectionable tasting materials and to give a highly desirable fruit aroma and flavor.

The elevated temperature treatment to which the partially acidified raw cane sugar is subjected has been found of great importance to help complete the reaction and produce a clean fruity flavor, particularly where, after the heat treatment, the sugar composition is clarified to remove the precipitated and coagulated materials.

The undissolved coagulated or precipitated material may be removed by filtration, centrifugalization, sedimentation or decantation.

In the filtration of the modified raw cane sugar, it is desirable to use an inert filtration agent such as diatomaceous earth. The use of activated carbon in the filtration of the reacted raw cane sugar has been found to be undesirable as where charcoal, carbon or other decolorizing agent is employed, the desirable fruit flavor characteristics of the present invention are not satisfactorily obtained.

Where the raw cane sugar has been heat reacted in an open vessel or at atmospheric pressure, which is not the preferred procedure, the removal of the coagulated or precipitated materials may take place before the syrup has been allowed to cool. Where desired, additional water can be added to dilute the syrup and to reduce its total solids content, for example, to about 50 to 70 Brix.

The heat treatment is desirably carried out in a pressure chamber at superatmospheric pressures to a temperature of about 260° F. to 290° F. The sugar composition may be subjected to an instantaneous heat treatment or may be held at the elevated temperature for a period of about 10 to 30 minutes. A heat treatment of about 10 minutes has been found most highly satisfactory.

The partially acidified raw sugar having a sucrose content of over 80% and desirably over 90% based upon total sugar solids must not be permitted to invert during the heat or acidification treatment to less than about 80% total sucrose content based upon total sugar solids and desirably no substantial inversion is permitted to take place during these treatments.

Although the raw sugar is heated in partially acidified condition as the preferred procedure, the raw sugar in substantially concentrated solution may less preferably either be first fully acidified to pH 2.5 to 3.6 followed by the heat treatment and filtration or first heated and then acidified to pH 2.5 to 3.6.

Following the acidification and heat treatment the syrup thus obtained is then concentrated to between 85% and 95% total solids with the addition of a small amount of pectin and the sucrose crystals are allowed to crystallize out, which crystals are surrounded by a jellified film containing the acid and heat reacted raw noncrystallizable sugar, acid, water and pectin.

Phosphoric acid is desirably utilized for the acidification of the raw cane sugar. There may also be utilized combinations of hydrochloric acid and the polycarboxylic aliphatic acids and including particularly the food acids such as tartaric acid, citric acid and malic acid or the polycarboxylic aliphatic acids may be used alone. There may also be used lactic acid, glycollic acid and less desirably sulphuric and similar acids or their various acid salts. Other acids which may be utilized are the dibasic acids such as succinic and malonic acid as well as the sugar acids such as gluconic acid and saccharic acid. The acids themselves should be free of noticeable flavor and are used for the sole purpose of reacting with the raw cane sugar in order to produce the fruit flavors of the present invention and the acids must be added in a sufficient quantity to produce the effective acidity in terms of pH concentration as indicated. It has not been found desirable, however, to use reducing acids of the nature of sulphurous acid or oxidizing acids such as nitric acid which appear to form objectionable constituents.

The amount of acid to be added is quite critical and it may be controlled in accordance with the ash content of the raw cane sugar.

In order to obtain the desired nonvolatile fruit flavor and aroma it is necessary to add between about 25 and 200 parts and desirably between 75 and 150 parts of tartaric acid or its acid equivalent based upon the standard pH scale to each 100 parts of ash on total solids in the raw can sugar.

For example, to raw cane sugar containing 1.0% ash based on total solids there is added between 0.75% and 1.5% and preferably an equal amount by weight of tartaric acid or its acid equivalent to obtain the desired pH and the desired fruit flavor.

It is then desirable to add a relatively small amount of pectin to permit the satisfactory formation of the brick or solid mass herein described and to obtain the most desirable and most concentrated stabilized fruit flavor. The amount of pectin required to produce the solid mass of the present invention is determined by the total quantity of sugars present in the liquid phase of this solid mass or brick after crystallization of the sucrose has been completed.

There is added between 0.75 and 3.0 parts of pectin and most desirably between 1.0 and 2.0 parts of pectin to each 100 parts of sugar solids dissolved in the continuous jellified phase of this brick.

The finished brick will contain not less than about 60% sucrose and most preferably will contain 80% or more of sucrose, the large proportion of which is in crystallized, solidified form and occupies the discontinuous phase which is enclosed in the continuous phase comprising the acid and heat reacted raw noncrystallizable sugars, acid, water and pectin.

The amount of invert or non-crystallizable sugars in the continuous phase may be adjusted within limits dependent upon the amount of free moisture which it is desired that the finished product will contain. Where it is desired to produce a brick of substantially low moisture content having, for example, less than about 5% total moisture, the invert sugar solids contained in the finished brick will not exceed about 3% of the total sugar solids whereas if it is desired that the finished brick will contain in excess of about 5% total moisture, which moisture is present in the continuous phase and which carries the other ingredients, the amount of invert sugar solids will be in excess of 5%, for example, against the total sugar solids present, but in no event is the sucrose less than 60% of the total sugars and desirably the sucrose is present in the amount of 80% or more of the total sugars.

Furthermore, the amount of total solids present in the aqueous continuous film surrounding the sucrose crystals will be not less than 65% and desirably will be in excess of 75%.

The brick or solid mass thus obtained by the addition of approximately 1 part of pectin to 100 parts of total sugars present in the continuous phase of the brick is in stable, homogeneous, noninverting, nonoxidizable, and readily solubilized condition and even at the high acidity and at the pH of about 2.5 to 3.6 required to produce the fruit flavor of the present invention is not subject to hygroscopicity or to further inversion of the sucrose contained therein.

The concentrated, acid and heat reacted raw cane sugar thus obtained assumes the character of a fruit with no characteristic whatsoever of the original raw cane sugar.

As the preferred procedure of the present invention, the raw cane sugar is first dissolved in water to provide a total solids of between about 40% and 70%.

At this point approximately half of the acid which would be required to produce a pH between 2.5 and 3.6 is added to cause the first reaction or modification of the raw cane sugar. The partially acid reacted raw cane sugar is then subjected to a heat treatment desirably under pressure at a temperature of between about 260° F. and 290° F. for a period of about 10 minutes. Concentrating is then continued to between 85 and 95 Brix at which point the balance of the acid is added to adjust the pH to between 2.5 and 3.6 and desirably to between pH 3.1 and 3.4

The concentrated raw cane sugar should not be filtered through bone char or charcoal but may only be filtered through a non-decolorizing filtration agent such as diatomaceous earth.

There is added to the acid and heat reacted, concentrated, raw cane sugar a relatively small amount of pectin, the pectin desirably first being prepared in aqueous solution as by preparing a 3% to 4.5% pectin solution, adding the pectin solution to the raw sugar product desirably with agitation, and then preferably concentrating to the moisture content which existed prior to the addition of the pectin or to the moisture which it is desired the brick or mass will contain.

This acid and heat reacted, concentrated, raw cane juice composition with the pectin or pectin material added and thoroughly distributed therethrough is desirably caused partially to solidify until the two phases constituting the crystallized sucrose on the one hand and the liquid phase which includes the acid and heat reacted raw noncrystallizable sugars, water, acid, pectin and a small portion of dissolved sucrose on the other hand are distinctly formed or visible.

The composition thus obtained is then poured into molds such as into boxes, barrels, or into suitable containers where it is allowed to cool and solidify completely whereupon, within a period of about 30 to 45 minutes, there is formed a solidified mass comprising the sucrose crystals which are surrounded by the continuous phase of the film containing the various ingredients.

As an alternative procedure the concentrated acid and heat reacted raw cane sugar composition may be agitated until the two phases of the crystallized sucrose and the noncrystallized portion are distinctly formed or visible and at that point the pectin solution may be added in the desired proportion and following thorough admixture of the pectin solution with the entire mass, making certain that the pectin is thoroughly distributed throughout the noncrystallized fraction, the finished product may then be poured into molds and allowed to cool and completely solidify.

As a further less desirable alternative procedure, the concentrated acid and heat reacted raw cane sugar composition may be concentrated to between 85 and 95 Brix and preferably to about 95 Brix after which the desired amount of pectin solution is added with agitation and the entire mass is thereupon concentrated further to the desired moisture content. The combination is then allowed to crystallize partially in the above described manner and at that point where the crystallized portion has substantially formed, the desired amount of acid is added to reduce the pH to between 2.5 and 3.6. The combination of acid and pectin may also be added to the entire mass simultaneously at the time that the major proportion of the sucrose has been allowed to crystallize, but this is a less preferable procedure than those outlined above.

As a specific example of the utilization of the present invention, the following may be noted:

Example I 1000 pounds of raw cane sugar crystallized from defecated cane juice were dissolved to 50 Brix and found to contain 0.6% total ash based upon total solids, and of the total sugar content, 5% was present as invert sugars and 95% as sucrose.

There was prepared a solution containing 6 pounds tartaric acid in 6 pounds of water. To the concentrated raw sugar syrup was added 6 pounds of the 50% solution of tartaric acid. The partially acid reacted raw cane sugar syrup was then heated under pressure to between 270° F.

and 290° F. for 5 minutes, allowed to cool and filtered. The partially acid reacted and heat reacted raw cane sugar syrup was then further concentrated to 95 Brix at which time the balance of 6 pounds of the 50% tartaric acid solution was added and the pH of this concentrated acid and heat reacted raw cane sugar was found to be pH 2.95.

At this point there were added to the mass with agitation 675 grams of pectin previously dispersed in water as a 4% solution.

The product was then reconcentrated to return it to 95 Brix.

The mass was further agitated for about 15 minutes at which time the product was poured into wooden boxes and allowed to solidify and cool forming the hard, solid mass.

It may be noted from the above that the 1000 pounds of raw cane sugar in this example contained 1000 pounds of total solids of which 6 pounds or 0.6% was ash. The amount of acid which was added was about 6 pounds or an equivalent weight with the amount of total ash in the raw cane sugar. Furthermore, it was estimated that in the above brick there were contained in the continuous phase 67,500 grams of total sugar solids and therefore based upon the use of preferably 1 part of pectin to each 100 parts of sugar solids in the continuous film there were added 675 grams of pectin in order to produce the brick of the present invention.

The bricks or solid masses of the present invention may very readily be utilized in the production of a wide variety of fruit flavored food products.

For example, they may be used in the baking industry, for confectionery purposes, in the production of jams and jellies, for beverages, in the preparation of alcoholic beverages or cordials, for ice cream, sherbets or ices, for individual tablets or briquettes and for similar food compositions.

The bricks or solid masses thus obtained have great advantage in being available for shipment at extremely low cost without requiring the use of containers and occupying a minimum amount of space in the holds of ships. Furthermore, these bricks are stable, homogeneous, noninverting, non-oxidizable and nonperishable and will remain uniform over long periods of time.

It has been surprisingly found that even though the bricks or solid masses are cut and upon cutting may expose a tacky surface, upon further standing for 12 to 24 hours, the continuous and discontinuous phases on the cut surfaces readjust themselves to reform the hard surface of the original brick before cutting.

For example, where the brick has been prepared to contain in excess of about 8% total moisture and preferably about 8% to 12% total moisture, the finished product is chewy so that the product in that form may be used as a confection without requiring the addition of substances that otherwise would be needed to give a chewy effect such as caramelized or boiled milk solids with or without fat, neither of which products need be present in the brick or solid mass of the present invention.

Furthermore, where large bricks or blocks of 10 pounds to 100 pounds weight are first prepared and where those blocks are then recut or reformed into the desired size as for use in the manufacture of confections, the exposed surfaces which at this higher moisture content may normally be tacky when first cut are within a relatively short time reformed into hard surfaces so that the product may be wrapped or otherwise used as a confection to give a finished product of extremely low cost, perfectly stable and homogeneous, noninverting, nonperishable, and non-oxidizable and having the desirable fruit flavor of the present invention.

Furthermore, the brick or bars may be reconstituted by dissolving in water or other aqueous medium or where a low moisture containing brick is made, by placing into finely divided condition and using for bakery purposes, confectionery purposes, ice cream, beverages, etc.

Where it is desired to prepare a jam or jelly from these bricks, the bricks may be reconstituted in water to about 65 Brix and the pectin deficiency may be compensated for by addition of more pectin.

*Example II*

100 pounds of the brick made in accordance with the procedure of Example I were dissolved in 50 pounds of water. At this point 393 grams of pectin were added by first dissolving the pectin water to make a 4.5% solution. The mixture was then further concentrated to about 65 Brix and upon cooling a fruit jelly formed within 30 minutes to 1 hour. This fruit jelly was found to be perfectly stable and homogeneous and could be kept for longer periods without change or loss of original flavor.

It has furthermore been found that where it is desired to make a jelly of higher density the process of the present invention is ideally suited for that purpose.

*Example III*

100 pounds of the brick made in accordance with the procedure of Example I were dissolved in 100 pounds of water. The combination was then concentrated to 85 Brix at which time 393 grams of pectin were added by first dissolving the pectin in a sugar syrup. The mixture was then reconcentrated to the prior 85 Brix. At this point the finished product was still free flowing and did not "set" for a period of between 45 minutes and 1½ hours which gave sufficient time for the product to be cast into molds. The product then "set" in the molds and a highly desirable fruit flavored, homogeneous, concentrated jelly or gum was formed.

In the preparation of a concentrated jelly, the total solids can be adjusted within any desired range such as by concentrating to from 75 to 90 Brix dependent upon the finished product desired.

It is particularly surprising to find that in accordance with the procedure outlined in Example III the product does not rapidly or prematurely "set" without giving time to place in molds as is normally encountered in the preparation of the usual type of concentrated jellies. Under normal conditions where a jelly is made from a fruit juice and sugar, for example, there is insufficient time available to place the finished product into molds and the product goes from a liquid state into a gel almost instantaneously. On the other hand, in accordance with the procedure of the present invention, the "setting" is naturally retarded and sufficient time is afforded for the proper packaging and handling of the finished product.

Furthermore, in accordance with the present invention, the amount of acid that is added is very substantially in excess of that which would enable one otherwise to produce a satisfactory product such as is required in the preparation of an ordinary fruit jelly. The acid that is added in accordance with the present invention is five to eight times or more that which it would be possible to add with any pectin solution in the preparation of a standard fruit jelly without damaging the normal jelly structure.

Furthermore, by the addition of this excessive amount of acid in the preparation of a jelly having the enhanced fruit flavor, there results a reaction which, together with the heat treatment, first of all, produces the fruit flavor that is so highly desirable and, secondly, permits proper jellification notwithstanding this high acid content.

Normally, in the preparation of a fruit jelly, for example, with each 1 part of pectin there is added not over about ¼ part to ⅓ part of tartaric acid or its acid equivalent. If the amount of acid is in excess of this ⅓ part, then the jelly does not form because the jelly would only form at a pH of between about 3.0 and 3.5 but if more than ⅓ part of acid is added and if the pH is lower than 3.0, as would be the case if an excess amount of acid is added, then no jelly would be obtained.

In accordance with the procedures of the present invention, however, there is added between 4 and 12 times the amount of acid that would be normally required to produce a standard fruit jelly and in spite of this high amount of acid added, the pH is then within the desired range of about 3.1 to 3.4 and the solid mass of the present invention may by the procedure outlined above be converted readily into a jelly.

Strangely, the fruit characteristic of the acid and heat reacted raw cane sugar appears to be a combination of plum, guava, currant, wild raspberry and prune with the objectionable characteristics of the raw sugar entirely gone.

The pectin used to form the solid mass or block does not appear to act in the same manner that it would in producing a standard fruit jelly but the pectin in combination with the heat treatment, the high acid and the other ingredients present in the continuous phase appears to form a plastic, somewhat resinous film which serves to protect and preserve the sucrose crystals which are contained in the discontinuous or dispersed phase and to enhance the fruit flavor.

Where the bricks or bars prepared in accordance with the present invention are subsequently to be used in the manufacture of a jelly, additional pectin may be required but there is taken into consideration the amount of pectin originally added and which amount is deducted from the total amount of pectin required to produce the desired jellification.

Where, however, the bricks are to be utilized by placing into finely divided condition and/or by dissolving in water or other aqueous medium, as for use in the manufacture of ice cream, ices, bakery products, confectionery products or beverages, then no additional pectin need be added.

In any event, the proper ratio between the ash and the acid must be so maintained as to completely react the acid with the non-sugar impurities of the raw cane sugar so as, with the heat treatment, to develop the flavor and aroma of the present invention.

Of particular importance is the fact that these novel flavors are produced in substantially nonvolatile condition so that when used in the manufacture of other foods where additional concentration or boiling is employed, the aromatic constituents and flavor complexes are not volatilized but are fully retained.

The nonvolatile character of the fruit flavor obtained in accordance with the present invention is of particular importance for all food products where high temperature treatment is involved and particularly in the manufacture of the so-called confectionery gums.

These gums are now limited to the use of artificial flavoring ingredients which artificial flavors, consisting principally of essential oils, are added at the close of the boiling treatment because of their high volatility. The natural fruit juices do not withstand the high and prolonged cooking temperatures to which the confectionery gums are subjected and therefore the natural fruits and fruit juices are not used in the production of the confectionery gums.

However, in accordance with the procedures of the present invention the cane juice or similar composition may very readily be employed in the production of these confectionery gums since prolonged and high temperature cooking does not appear to affect their intensity or desirability of fruit flavor and the finished confectionery gum or similar product which has been subjected to extensive and prolonged high temperature treatment will retain its natural desirable fruit flavor.

Furthermore, in accordance with the present invention a solid mass of high concentrated food value and which appears to be compressed but which does not require compressing is obtained, which product although in acid condition reverts to an alkaline condition upon ingestion, and there are retained the natural vitamin values, minerals and other constituents originally present in the raw cane sugar although in reacted form.

Where the solidified cane juice composition in brick, bar, granule, flaked or similar form produced in accordance with the present invention is to be subsequently treated with acid in its final use in the manufacture of a food product, the acid reaction may, where desired, be withheld until the brick or bar is ready for final utilization. Under this less preferable procedure a stable, noninverting product is obtained but by reason of the acid reaction with the raw sugar not having been completed, the product does not have any characteristic of a fruit.

One of the most desirable features of the present invention is that the product of the present invention will greatly enhance and support other fruit flavors and serves as a better base for all fruit flavors since with less addition of flavor, a stronger flavor is obtained.

For example, the addition of only about ¼ to 1/10 the amount of peaches or peach flavor or cherries or cherry flavor or prunes or prune flavor is required when used in combination with the raw sugar composition of the present invention to give the intensity of flavor and aroma as would normally be required by the full quantity of peaches or cherries or prunes. This is of great importance in connection with the manufacture of jellies, and also in the production of canned fruits, fruit syrups, fruit juices, ices and ice creams.

Furthermore, when the products of the present invention are utilized in this manner they will contain no artificial flavor, coloring matter or preservative and are high in intrinsic food value so that by the procedures of the present invention a product of low economic value and containing materials that are normally converted into waste products is changed into materials of high economic value.

One of the most unusual characteristics of the products produced in accordance with the present invention is that the flavors are non-oxidizable and will retain their original flavor and aroma characteristics over long periods of time without change or diminution.

Whereas normally the flavors in food products are very readily oxidizable so that upon exposure to air or light or upon storage they lose their natural flavor characteristics or they develop objectionable flavor characteristics or whereas other food products having certain aromas and flavors contain the aromas and flavors in the form of highly volatile essential oils, the products of the present invention have flavors which are non-oxidizable and substantially non-volatile.

For example, the products made in accordance with the present invention may be boiled over long periods of time or carried at elevated temperatures without loss or diminution of their natural flavors or they may be stored for a period of two or more years even under conditions of relatively high temperature and humidity or upon exposure to light and the flavors are still retained.

The products produced in accordance with the present invention have the great advantage of being more readily dispersible and soluble when placed into solution than are similar products which do not contain the sucrose crystals surrounded by the continuous phase of the plastic film of the described products.

The ready solubility and dispersability of the products of the present invention are also of great importance when these products are eaten so that they are readily chewable or dissolved when placed upon the tongue or so that they may be readily solubilized or dispersed when used for manufacturing purposes in the preparation of other food products.

The fruit flavor obtained in accordance with the procedures of the present invention appears to result principally from the acid and heat reaction with the raw cane sugar and which fruit flavor is rather enhanced and becomes more readily apparent upon treatment with pectin in accordance with the procedures outlined.

Where it is desired to adjust the ash content of the raw cane sugar to produce the specific desired fruit flavor between the limits of 0.35% and 1.5% ash based on total solids, this may be accomplished in one of several ways.

For example, if the ash content is too high, sweetening agents such as sucrose, including refined cane or beet sugar, dextrose, corn syrup, lactose, etc., may be added. In order to obtain an ash content of 0.5% from a raw cane sugar having an ash content of 1.0%, one part of the raw cane sugar or of the acid and heat modified raw cane sugar may be combined with one part of refined sucrose, dextrose or corn syrup, but the acidity of the combined sugars should be between the critical limits of 2.5 and 3.6 at the concentration of final use. Where the raw cane sugar is first combined with the additional sweetening agent to provide the desired ash content without the raw cane sugar having first been subjected to the elevated temperature treatment, then the combination of the raw cane sugar and the sweetening agent is subjected to the elevated temperature treatment in order to obtain the fully desired results of the present invention.

Where the ash content of the raw cane sugar is too low, then there may be combined with the raw cane sugar the outer syrup film removed by washing of the raw sugar crystals and which outer syrup film will have an ash content of 2.0% to 3.0%.

By the term "raw cane sugar" as used in the specification and in the claims there is included not only the sugar which has been crystallized from the cane juice and which contains an outer film of non-crystallizable sugars and non-sugar impurities, but there is also included the outer syrup film which may be removed by washing the raw sugar crystals and which may be used in combination with other sweetening agents where the ash content originating from the outer syrup film or from the raw sugar is within the critical limits of 0.35% and 1.5% based upon total solids. There is also included the sugars remaining after the raw sugars have been washed to remove their outer syrup film.

For example, the raw sugar crystals may be washed to remove that portion of the raw sugar crystals which is contained in the outer surfaces of the individual crystals. This may be accomplished by the raw sugar crystals being placed into a centrifuge and washed with water to remove and concentrate the syrup film contained on the outer surfaces of the raw sugar crystals.

The outer film of the raw sugar crystals is desirably filtered through diatomaceous earth and there is preferably not used any charcoal, bone black, or other similar decolorizing agent in the filtration of the outer film.

The outer film may be concentrated either in a vacuum pan or in an open kettle and the filtration step may take place either before or after concentration.

This filtered, concentrated outer film will have a purity or a total sucrose content of from about 75% to 83% although there may be some minor variations dependent upon the extent to which the raw sugar crystals are washed. Where the raw sugar crystals are washed for a longer period, the sucrose content may be as high as 87% and where the raw sugar crystals are washed with a relatively small amount of water the sucrose content may be as low as 70%.

The raw sugars crystallized from the original cane juice may be washed to remove the outer syrup film or, where desired, that portion which has not been crystallized into raw sugar from the cane juice may be recombined with additional cane juice and crystallized further producing a second batch of raw crystallized sugar which may then be washed to remove the outer syrup film. The outer syrup film may be removed from any of these raw sugar crystals as produced from the original cane juice or from cane juice containing compositions.

As examples of blends of sugars that may be utilized for acid and heat modification in accordance with the procedures of the present invention, the following may be noted:

(a)

| | Parts |
|---|---|
| Outer syrup film of raw cane sugar having an ash content of 2.0% | 1 |
| Refined cane sugar having an ash content of 0% | 3 |

(Final ash content 0.5%)

(b)

| | Parts |
|---|---|
| Raw cane sugar having an ash content of 0.6% | 1 |
| Outer syrup film of raw cane sugar having an ash content of 2.0% | 1 |

Washed raw cane sugar left after removing outer syrup film, said washed raw cane sugar having an ash content of 0.2%_____ 4

(Final ash content of 0.53%)

(c)

| | Parts |
|---|---|
| Raw cane sugar having an ash content of 0.6%_____ | 1 |
| Outer syrup film of raw cane sugar having an ash content of 2.0%_____ | 2 |
| Refined cane sugar having an ash content of 0%_____ | 2 |

(Final ash content 0.92%)

It is of the greatest importance to subject the raw cane sugar to the elevated temperature treatment in excess of 245° F. and preferably to between 255° F. and 290° F., desirably under pressure, in order to obtain the most desirable results of the present invention. This is done where the raw cane sugar has been dissolved in water at a concentration of not less than about 40 Brix, the elevated temperature treatment varying from an instantaneous treatment to about 10 minutes and desirably not in excess of about 15 minutes.

There may also be included in the sugar composition of the present invention a small amount, up to about 10% to 20%, of refiner's molasses or filtered refiner's molasses as an additional ingredient. Where the refiner's molasses or similar intermediate refined sugar compositions are added, additional acid will have to be added in order to arrive at the critical pH limit of 2.5 to 3.6 and the added ingredients do not have to be heated to temperatures of over 245° F. to produce the heat modification herein described.

By the term "raw cane sugar ash" as used in the specification and claims is meant the ash of the raw cane sugar or the ash of raw cane sugar constituents such as the ash of the outer syrup film removed from the raw cane sugar or the ash of the sugar left after the outer syrup film has been removed from the raw cane sugar.

The term "pectin" as used herein is understood to mean pectin of definite graded strength. However, with suitable modifications it also includes pectic acid and the pectins of varying degree of demethoxylation. There are, for example, included those substances such as the pectic substances which contain a large portion of anhydrogalacturonic acid units, the protopectins, pectinic acid which include the colloidal polygalacturonic acids containing more than a negligible proportion of methyl ester groups, pectin, pectic acid and the salts of pectic acid including either the normal or acid pectates.

By the use of the term "heat and acid reacted raw non-crystallizable sugars" there are included those raw cane sugars as herein described which are either in substantially raw condition or which sugars remain as the non-crystallizable fraction after the crystallization of the sucrose normally present in such raw cane sugars.

Having described my invention, what I claim is:

1. A stable, noninverting nonhygroscopic, solid sugar composition comprising crystallizable sugars which are present in an amount of at least 60% based upon total sugar solids in a discontinuous phase, said crystallizable sugars being surrounded by a noninverting plastic film comprising the acid and heat reaction products of raw noncrystallizable sugars, water, and a relatively small amount of pectin, said composition having a pH of between 2.5 and 3.6.

2. A stable, noninverting, nonhygroscopic, solid sugar composition comprising crystallizable sugars which are present in an amount of over 60% based upon total sugar solids in a discontinuous phase, said crystallizable sugars being surrounded by a noninverting plastic film comprising the acid and heat reaction products of raw noncrystallizable sugars, water, and a relatively small amount of pectin, said composition having a pH of between 2.5 and 3.6

3. A fruit flavored, stable, nonhygroscopic, noninverting, acid and heat modified sugar composition comprising at least 60% crystallizable sugars based upon total sugar solids, said crystallizable sugars occupying a discontinuous phase and surrounded by a continuous phase of a noninverting plastic film comprising the acid and heat reaction products of raw noncrystallizable sugars, water, and a relatively small amount of pectin, said sugar composition having a pH between 2.5 and 3.6 and said sugar composition having an ash content of between 0.35% and 1.5% based upon total solids.

4. A stable, noninverting nonhygroscopic, solid, raw cane sugar composition, carrying in a discontinuous phase at least 60% of crystallizable sugars, said crystallizable sugars being surrounded by a noninverting plastic film comprising the acid and heat reaction products of raw noncrystallizable sugars, water, and a relatively small amount of pectin, said composition having a pH of between 2.5 and 3.6.

5. A fruit flavored, noninverting, solid, acid and heat reacted, solidified, raw cane sugar composition, said composition having a pH between 2.5 and 3.6, said composition comprising at least 60% of crystallized sucrose in the dispersed phase thereof and a minor proportion of the acid and heat reaction products of raw noncrystallizable sugars, water and pectin in the continuous phase thereof.

6. A process of producing stable, nonhygroscopic, noninverting sugar compositions from raw cane sugars which comprises adding to a concentrated raw cane sugar material carrying between 0.35% and 1.5% ash based upon total solids and carrying in excess of 60% sucrose based upon total solids a sufficient amount of acid to produce a pH of between 2.5 and 3.6 with heating to over 245° F. for a period of about 10 minutes, adding a small amount of pectin at between 85 and 95 Brix and allowing to solidify whereby the large proportion of sucrose crystals which are in dispersed condition are surrounded by a stable, noninverting film of acid and heat reacted raw noncrystallizable sugars, acid and pectin.

7. A process of producing a nonhygroscopic, noninverting, stable sugar composition which comprises preparing a raw cane sugar material carrying between 0.35% and 1.5% ash based upon total solids, concentrating said material to at least 85 Brix, heating to over 245° F. for a short period of time, acidifying to a pH of between 2.5 and 3.6 and then adding thereto between 0.75 and 2.75 parts of pectin for each 100 parts of total sugar solids and solidifying, said sugar composition containing at least 60% of crystallized sucrose in the disperse phase thereof.

8. A method of preparing a fruit flavored, noninverting, noncrystallizable, solidified, raw cane sugar composition which comprises reacting a raw cane sugar carrying between 0.35% and 1.5% ash based upon total solids with acid and heat to a pH between 2.5 and 3.6 and to a temperature of over 245° F. for a period of about 10 minutes, concentrating to at least 85 Brix, adding a relatively small amount of pectin and solidifying, said sugar composition containing at least 60% of crystallized sucrose in the disperse phase thereof.

9. A process of producing a nonhygroscopic, noninverting, stable, solid sugar composition which comprises adjusting the pH of a concentrated raw cane sugar syrup to between 4.5 and 5.5, heating to over 245° F. for about 10 minutes but insufficient to cause substantial inversion, filtering, acidifying to a pH of 2.5 to 3.6, concentrating to between about 85 and 95 Brix and then adding a relatively small amount of pectin and allowing the composition to solidify whereby the large proportion of sucrose crystals which are in dispersed condition are surrounded by a stable, noninverting, jellified film of invert sugars, non-sugar solids and pectin, said invert sugars, non-sugar solids and pectin being present in said film in a relatively small quantity and said pectin being present in insufficient amount to jellify the sucrose present.

10. A process of producing a nonhygroscopic, noninverting, stable raw sugar composition which comprises preparing a raw cane sugar material, said sugar material carrying between 0.25% and 2.5% ash based upon total solids, and carrying at least 60% sucrose based upon total sugar content, concentrating said material to at least 85 Brix, acidifying to between pH 2.5 and 3.6, heating to between 245° F. and 290° F. for between 0 and 15 minutes, adding thereto at least 0.75 part of pectin for each 100 parts of total sugar content and allowing to solidify, said ash being that naturally present in the raw sugar, said sugar composition being solid and containing at least 60% sucrose based upon total sugar content.

11. A process of producing a nonhygroscopic, noninverting, solid, stable fruit flavored sugar composition which comprises preparing raw cane sugar material carrying between 0.25% and 2.5% ash based upon total solids, concentrating the said material to at least 40 Brix, heating said material to between about 245° F. and 290° F. for about 0 to 15 minutes, removing the coagulated and precipitated residues, concentrating said material to at least 85 Brix, acidifying said material to pH between 2.5 and 3.6, adding thereto with agitation between 0.75 and 2.75 parts of pectin for each 100 parts of dissolved sugars, allowing to cool and solidify, said ash being that naturally present in the raw sugar and said composition containing at least 60% sucrose based upon total sugar content.

12. A solidified, fruit flavored, noninverting, solid, 245° F. to 290° F. heat reacted raw cane juice composition having an ash content of between 0.25% and 2.5% based upon total solids, said cane juice composition having a pH of 2.5 to 3.6 and carrying a relatively small amount of pectin, said ash being that naturally present in the raw sugar and said composition containing at least 65% sucrose based upon total sugar solids.

ALEXANDER M. ZENZES.

REFERENCES CITED

The following references are of record in the file of this patent:

UNITED STATES PATENTS

| Number | Name | Date |
| --- | --- | --- |
| 2,072,895 | Lund | Mar. 9, 1937 |
| 2,046,567 | Lund | July 7, 1936 |
| 2,098,604 | Whymper | Nov. 9, 1937 |
| 2,176,034 | Musher | Oct. 10, 1939 |
| 1,826,701 | Ames | Oct. 13, 1931 |
| 2,054,873 | Whitby | Sept. 22, 1936 |
| 2,261,919 | Pittman | Nov. 4, 1941 |
| 1,532,271 | Slay | Apr. 7, 1925 |

FOREIGN PATENTS

| Number | Country | Date |
| --- | --- | --- |
| 308,850 | Germany | 1918 |
| 16,540 | Great Britain | 1889 |
| 17,557 | Great Britain | 1890 |

OTHER REFERENCES

Int. Sugar Jr., July 1944, page 190.
Confectioners Jr., January 1937, page 31.